March 28, 1944. S. L. DIAS 2,345,466
IRRIGATION CONTROL SYSTEM
Filed Oct. 8, 1941
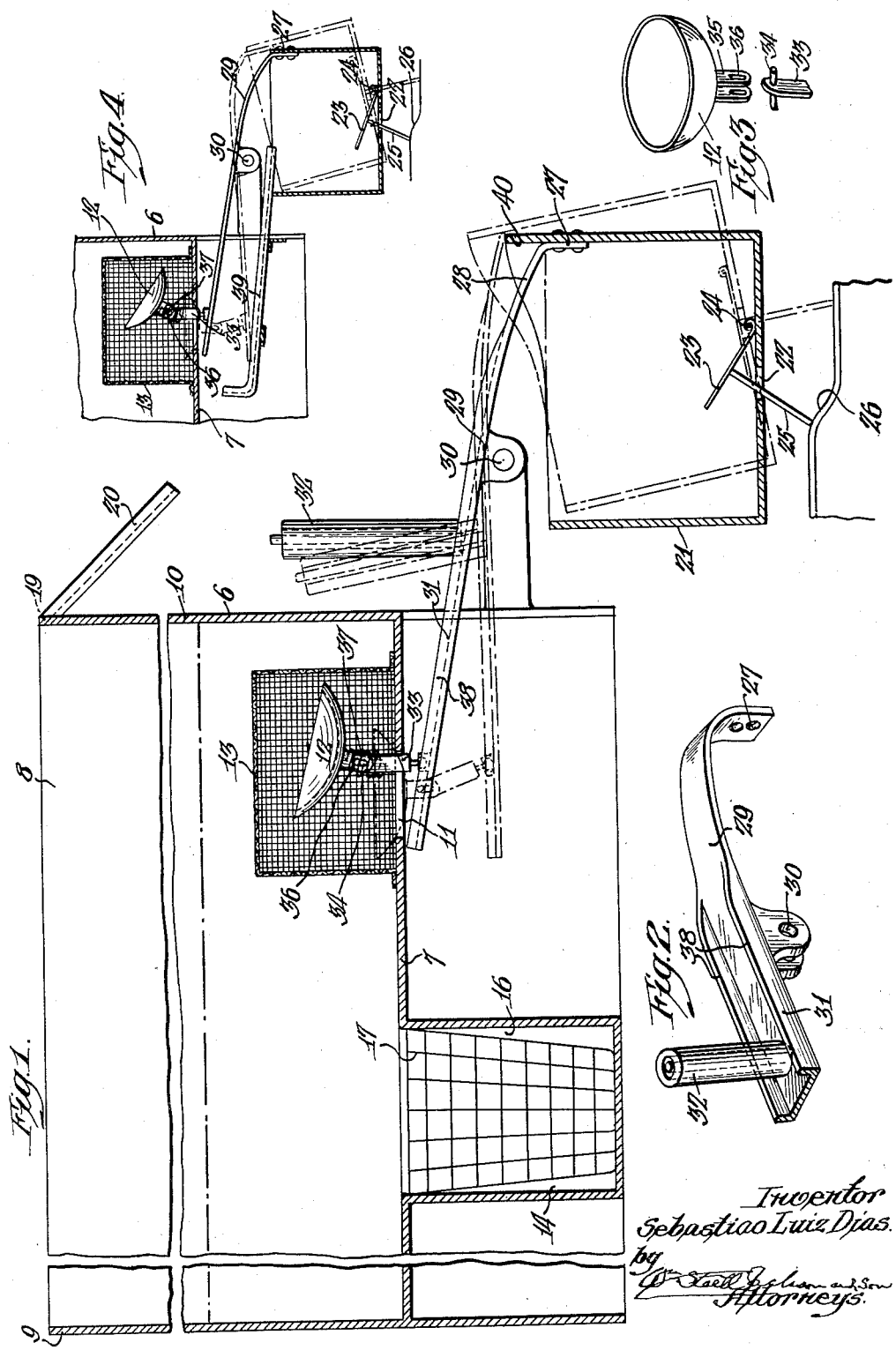
Inventor
Sebastiao Luiz Dias
by
Attorneys Patented Mar. 28, 1944

2,345,466

UNITED STATES PATENT OFFICE 2,345,466

IRRIGATION CONTROL SYSTEM

Sebastiao Luiz Dias, Bethlehem, Pa.

Application October 8, 1941, Serial No. 414,165

7 Claims. (Cl. 61—12)

My invention relates to systems of irrigation intended automatically to defer water flow until a quantity has been accumulated and then to distribute the accumulated water throughout the irrigation system.

A purpose of the invention is to divert part of an irrigation flow from a pool and to use the diverted water to maintain the flow.

A further purpose is to open a pool outlet valve for irrigation by means of connections operated by a movable bucket, in which the valve is open when the bucket is filled with water and the valve is permitted to close when the bucket is empty, filling the bucket initially by overflow water, maintaining it filled by diversion of outlet flow and ultimately emptying the bucket to close the valve.

A further purpose is to use the intermittent flow of the water for irrigation as a basis for trapping the fish in the stream.

A further purpose is to control water flow for power purposes operating the power automatically at full flow during drainage times and conserving the water for future operation in between times.

Further purposes will appear in the specification and in the claims.

Figure 1 is a vertical longitudinal section showing one form of the invention.

Figure 2 is a fragmentary perspective showing a portion of the valve operating mechanism of Figure 1.

Figure 3 is a fragmentary separated perspective view of a valve illustrated.

Figure 4 is a fragmentary vertical longitudinal section showing a modified form.

In the drawing similar numerals indicate like parts.

There are many places and differing conditions in which water is available for irrigation purposes in a more or less continuous flow of a stream whose continuous quantity of flow is insufficient to fill drainage ditches. Under these circumstances if the water flows all the time it will reach the nearest points for use only and will not adequately spread throughout the drainage ditch system.

The present invention is directed to the use of such a system for adequate intermittent irrigation, suppressing the flow of water in the meantime in order to accumulate water sufficient for the next drainage flow.

In Figures 1 and 2 the pool of water, it may be any lake or pond or tank, is symbolized by a tank 6, which has bottom walls 7, side walls 8 and end walls 9 and 10. Irrigation outlet flow takes place at intervals through a valve opening 11 closed by any convenient form of valve 12.

The valve outlet is suitably screened at 13 and at the lowest point 14 of the pool a fish-receiving chamber 16 has been inserted from which larger fish can be removed by withdrawal of a basket 17, but in which the smaller fish will be left within the space 16.

The fish trap represented by the space 16 and the net or basket is particularly useful with the intermittent system because it gives opportunity at frequent intervals to remove the fish from the trap.

An overflow 19 is provided which is guided by a trough or pipe 20 so as to fall within a bucket 21 having an opening 22 in the bottom. The opening may be small, open all the time, or may be larger, closed by any suitable valve, such as gravity valve 23. The valve 23 is shown as pivoted at 24 so as to be capable of being tilted by engagement of its stem 25 with any outside guide 26 when the bucket is in its lowermost position.

The bucket is connected with the discharge valve in such a way that when the bucket is filled the valve is opened but when the bucket empties the valve is closed. A convenient connection is shown, in which the bucket is secured at any suitable point 27 to one end 28 of a sweep 29 pivoted at 30 and counterweighted at the other end 31 by weights 32.

The end 31 carries a post 33, pin 34 and ears 35. The pin fits into slotted openings 36 so as to allow some vertical play and the post and ears are kept reasonably in line against excessive lateral falling movement of the valve by a surrounding spiral spring 37 which need have no other duty than embracing the parts above and below the pin and preventing such excessive tilting movement of the valve 12 as might interfere with accommodation of the valve to the valve seat when the valve is closed.

A cup-shaped form of valve is used for the reason merely that it assists in guiding itself to the seat and gives a sharper edge of valve engagement with the seat than would be present in case of a flat valve.

The lever end 31 of the sweep may extend far enough into the path of outlet flow to divert a small part of this flow into the bucket (Figure 1) but without receiving enough of the energy of the flow to make its pressure objectionable in lifting the full bucket. On the other hand (Figure 4), fixed surfaces can be used to divert enough flow into the bucket to keep the bucket filled as long as the discharge from the pool takes place. When fixed surfaces are used the sweep is not needed for the diversion.

Where the sweep is to carry water to the bucket it is slightly guttered or concaved on its upper face. This is secured in Figure 1 by raising its sides 38. In the open position of the valve the end of the sweep is sloped downwardly toward the pivot point.

As some part of the sweep lies beneath the irrigation outlet flow in Figure 1 a part of the outlet water will be guided into the open end of the bucket, tending to keep the bucket filled during the outlet flow of water from the pool.

The normal position of the bucket is that shown in the dotted lines at which the bucket weight and the weight of this arm of the sweep are overcome by the weight of the opposite arm of the sweep, of the counterweight and of the valve parts carried by that end of the sweep. This causes closing of the valve and the weight of the water in the pool above the valve tends to keep the valve closed.

Each time that the pool fills to the point where overflow takes place, water from the overflow fills the bucket and the combined weight of that end of the sweep, the water and the water bucket (the valve in the bottom of the bucket being closed) tilts the bucket and sweep to the position shown in full lines, in which the post and valve connection carried by the opposite ends of the sweep lift the pool discharge valve to open position.

Even with a valve in the bucket some leakage past the valve is not objectionable and may even be desirable.

Figure 4 presents a form which has some advantages over that in Figure 1 in that water is not diverted into the bucket by the sweep during irrigation discharge flow but is diverted into the bucket by a fixed guide or by fixed guides 39, lying within the path of flow of the irrigating discharge and diverting a sufficient part of the irrigation flow into the bucket for the bucket to be held down notwithstanding leakage through the bottom outlet.

The remainder of the figure may be the same as that in Figure 1 though there is not the same reason for extending the bucket wall at 40 above the point of attachment to the sweep as there is when the sweep is to carry irrigating water to the bucket.

The out flow from the bucket through the bottom is mingled with the remainder of the irrigating flow which is passing out from the bottom of the pool to supply the total volume of irrigation flow from the pool.

It will be evident that the total flow from the pool is used for irrigation, notwithstanding that some part of the overflow is used preliminarily to weight the bucket so that the sweep may open the irrigating outlet from the bottom of the pool and that outlet water is used to maintain the valve open.

It will be evident that the overflow may be any stream at the level of the pool and that the valve etc. in and below the bottom of the pool may be placed within the bottom of a natural pond or dam or may be a wholly artificial tank.

It will be evident that any type of trap may be used to catch the fish, the basket or net offering the most convenient form.

My invention may be used to control water flow for other purposes, such as water powers for public or private purposes drawing from dams or lakes or other sources. The fish trap is advantageous whatever the ultimate use of the water.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention what I claim as new and desire to secure by Letters Patent is:

1. In an intermittent irrigating system, walls forming a pool having an overflow and having an irrigating discharge opening from the bottom of the pool, a valve for said opening, a bucket receiving flow from the overflow and having an opening in its bottom for outward flow of water, counter-balancing connections between the bucket and the valve whereby the bucket with water in it operates the valve to open and when empty allows the valve to close and means for directing part of the irrigating main discharge into the bucket.

2. In an intermittent irrigating system, walls forming a pool, having an overflow and in the bottom an irrigating outlet, a valve for the main discharge outlet, a bucket adapted to receive overflow and having an outlet in the bottom of the bucket, counter-balancing connections between the bucket and the discharge outlet valve, the weight of the bucket with the water from the overflow causing the connections to open the valve, and walls guiding part of the bottom discharge from the valved discharge outlet into the bucket, whereby the bucket is maintained with an overbalancing quantity of water in it until the pool has drained.

3. In an intermittent irrigating system, walls forming a pool having an overflow, and, in the bottom an irrigating main outlet discharge opening, a main discharge valve closing the irrigating opening, a pivoted sweep adapted to open the valve and to allow it to close, a bucket on one end of the sweep adapted when empty to be lifted by overbalance of the opposite end of the sweep, permitting the main discharge valve to be closed and adapted when filled to shift with the position of the sweep and lift the valve, means for emptying the bucket when the valve is lifted and guttered means for directing part of the main irrigating flow from the bottom opening into the bucket.

4. In an irrigating system, walls forming a pool having an overflow and having an outlet for main irrigation flow from the bottom of the pool, a valve adapted to close the irrigation outlet, a sweep adapted to shift the valve and movable about an axis, a bucket supported by one end of the sweep located in position to receive water from the overflow and having a bottom opening, adapted when filled to open the valve and when empty to allow the valve to close and means carried by the sweep for directing part of the irrigation flow from the bottom outlet into the bucket, the outflow from the opening of the bucket mingling with the remaining irrigation flow from the pool.

5. In an irrigating system, walls forming a pool having overflow and a bottom outlet for main irrigation discharge, a valve for the outlet, a bucket within the path of the overflow and having an outlet, a sweep at one end supporting the bucket, pivoted at an intermediate point, at the other end connected with the valve, the bucket when filled opening the valve or holding it in open position and when empty being lifted by the other end of the sweep and means beneath the bottom irrigation discharge directing part of the discharge into the bucket.

6. In an irrigating system, walls forming a pool having overflow and a bottom outlet for main irrigation discharge, a valve for the outlet, a bucket within the path of the overflow and having an outlet, a sweep at one end supporting the bucket, pivoted at an intermediate point, and at the other end engaging the valve to open it or to permit it to be closed, the bucket when filled over-balancing the sweep and connections, opening the valve or holding it in open position and when empty being lifted by the other end of the sweep and conduit means carried by the sweep guiding a part of the main bottom discharge from the bottom outlet into the bucket.

7. In an irrigating system, walls forming a pool having overflow and a bottom outlet for main irrigation discharge, a valve for the outlet, a bucket within the path of the overflow and having an outlet, a sweep at one end supporting the bucket, pivoted at an intermediate point and at the other end connected with the valve, the bucket when filled opening the valve or holding it in open position and when empty being lifted by the other end of the sweep and fixed channel means in the path of the irrigation bottom discharge directing part of the discharge into the bucket.

SEBASTIAO LUIZ DIAS.